(12) United States Patent
Haraway, Jr.

(10) Patent No.: US 6,196,620 B1
(45) Date of Patent: Mar. 6, 2001

(54) AERODYNAMICALLY RESPONSIVE VEHICULAR UNDERCARRIAGE SAFETY SPOILER SYSTEM

(76) Inventor: William H. Haraway, Jr., 319 Rudisill Rd., Hampton, VA (US) 23669

( * ) Notice: Subject to any disclaimer, the term of this patent is extended or adjusted under 35 U.S.C. 154(b) by 0 days.

(21) Appl. No.: 09/523,611

(22) Filed: Mar. 13, 2000

Related U.S. Application Data (60) Provisional application No. 60/125,086, filed on Mar. 19, 1999.

(51) Int. Cl.[7] .................................................. B60J 1/18
(52) U.S. Cl. .................................. 296/180.5; 296/180.1; 180/903
(58) Field of Search ............................. 296/180.1, 180.5; 180/903

(56) References Cited

U.S. PATENT DOCUMENTS

| | | | |
|---|---|---|---|
| 4,119,339 | * 10/1978 | Heimburger | .......................... 296/1 S |
| 4,511,170 | * 4/1985 | Sankrithi | ................................ 296/1 S |
| 4,678,118 | * 7/1987 | Fukami et al. | .................. 237/12.3 B |

FOREIGN PATENT DOCUMENTS

| | | | |
|---|---|---|---|
| 2159636 | * 5/1973 | (DE) | ................................. 296/180.1 |
| 3245410 | * 5/1984 | (DE) | ................................. 296/180.1 |
| 3625814 | * 2/1988 | (DE) | ................................. 296/180.1 |
| 3712048 | * 10/1988 | (DE) | ................................. 296/180.1 |
| 0601292A1 | * 5/1994 | (EP) | ................................. 296/180.5 |
| 560594 | * 1/1959 | (IT) | ................................. 296/180.1 |

* cited by examiner

*Primary Examiner*—D. Glenn Dayoan
*Assistant Examiner*—Mickki D. Murray
(74) *Attorney, Agent, or Firm*—Wallace J. Nelson (57) ABSTRACT

An undercarriage spoiler system for a race motor vehicle utilizes a first spoiler plate disposed parallel and adjacent to the horizontal slotted rear bumper of the vehicle and secondary spoiler plates disposed in the vehicle rear quarter panels and perpendicularly to the first spoiler plate. During high speed vehicle spin-out and rearward movement, the spoiler plates pivotally move from a spring-retained position, parallel with the vehicle undercarriage, to an angular relationship therewith to spoil the reverse high speed air flow over the vehicle undercarriage and assist in effecting stabilization of the vehicle. Tension or torsion springs return the spoiler plates to their static un-deployed position once the vehicle recovers from the spin-out.

20 Claims, 5 Drawing Sheets

AERODYNAMICALLY RESPONSIVE VEHICULAR UNDERCARRIAGE SAFETY SPOILER SYSTEM

CLAIM OF BENEFIT PROVISIONAL APPLICATION

Pursuant to to 35 USC 119, the benefit of priority from provisional application Ser. No. 60/125,086 with a filing date of Mar. 19, 1999 is claimed for this non-provisional application.

FIELD OF THE INVENTION

This invention relates to spoiler systems in general, and relates specifically to an aerodynamically responsive vehicular undercarriage safety spoiler system for race cars. As used herein, the term "race cars" is intended to include cars, as well as trucks, and any similar vehicle adapted for high speed movement on a solid surface.

BACKGROUND OF THE INVENTION

Various types of fixed rear spoilers have been employed for automobiles, including race cars, that serve to spoil or divert air flow passing over the aerodynamic surfaces of the vehicle to thereby reduce, or negate, the aerodynamic lift created thereon by high speed air flow. These spoilers are normally set at a minimum angle by the sanctioning body controlling race car competition. At this angle, the spoilers located on the desk lid of vehicles provide positive aerodynamic down forces on the rear end of the vehicle to thereby increase tire traction, enhance directional stability and, as one of several devices employed, to limit maximum vehicle speed. Speeds approach or exceed approximately one-hundred ninety miles per hour (190 mph) during competition and often, when one race car contacts another aft of the vehicle center of gravity of the vehicle, at these high speeds, radial inertia forces cause it to rotate or spin, through a one-hundred eighty degree arc angle and become airborne while going in the backward direction. The fixed spoiler, and aerodynamic design of the race car vehicle, exposed to the high velocity aerodynamic air stream lifts the rear end of the car off the ground, resulting in tumbling, cart-wheeling and airborne rolls before striking the ground. Extensive car damage and/or driver injury is the result. The hard mounted, or fixed spoiler, at a high angle of attack contributes greatly to the aerodynamic lift effect when traveling in a high speed, backward mode.

To alleviate this problem, pivotally movable rear deck-mounted spoilers have been proposed and are disclosed in applicant's prior U.S. Pat. No. 5,454,619. Also, roof mounted spoilers that deploy only during vehicle spin or during high speed vehicle backward movement are disclosed in U.S. Pat. No. 5,374,098. While these prior art devices improve vehicle stabilization during spins and during high speed backward movement, they do not influence high velocity air movements under the vehicle that also provide positive pressure lift on the vehicle. Air flow over areas of the undercarriage of a race vehicle not influenced at certain angles during spin-out by these prior art systems include the rear floor pan, fuel cell, wheel wells and other apparatus.

Therefore, there is a need in the art for further vehicle stabilization during spin outs and during high speed backward movements.

Accordingly, it is an object of the present invention to provide improved aerodynamic stability to a race vehicle during spin-out.

Another object of the present invention is to provide a spoiler system for the undercarriage of a race vehicle that is responsive to the direction of movement of the vehicle.

Another object of the present invention is to provide an angular adjustable spoiler system for the undercarriage of a race vehicle.

An additional object of the present invention is to provide apparatus for creating air turbulence and drag as air passes underneath of a race vehicle during spin-out and subsequent rearward movement.

A further object of the present invention is to provide a spoiler system for the undercarriage of a race car vehicle that is pivotally movable between a position having a favorable effect on the air flowing underneath the vehicle when traveling in a forward direction, to a position spoiling the aerodynamic air flowing underneath the vehicle when traveling in a high speed rearward direction.

A still further object of the present invention is to provide a spoiler system for the undercarriage of a race vehicle wherein the spoiler plate is aerodynamically and spring urged to return to its normal, or static un-deployed position, as the race vehicle resumes its normal forward direction after recovering from a spin.

SUMMARY OF THE INVENTION

According to the present invention, the foregoing and additional objects are attained by providing a spoiler plate transversely, and pivotally, connected to the aft undercarriage, and adjacent to the rear bumper of a race car vehicle. Additional spoiler plates are also pivotally connected to the vehicle aft undercarriage and are essentially perpendicularly disposed relative to the first spoiler plate. These perpendicularly disposed spoiler plates are located in spacing in the rear lower quarter panel on each side of the vehicle.

The individual spoiler plates are in the form of a unitary plate in one aspect of the present invention and two or more segmented plates in other aspects of the invention. The first plate and the perpendicularly disposed spoiler plates are of the same construction, and function, with the only particular difference being in the sizes thereof. In the preferred embodiment, radial pivot arms support the spoiler plate(s). The radial pivot arms are secured to a horizontal mounting support structure fixed, and adjacent, to the aft end of the vehicle frame.

The radial pivot arms serve to limit the pivotal movement of the spoiler plate(s) in both the fore and aft directions. Tension or torsion springs connect the radial pivot arms, and maintain them in contact with the mounting structure when not under the influence of air flow acting on the rear of the vehicle during spin-out and high speed rearward vehicle movement. The vehicle rear bumper is provided with one or more horizontal slots along the length thereof to permit high speed air flow therethrough to contact the spoiler plate(s) during vehicle spin-out and high-speed rearward vehicle movement. The transverse spoiler plates are provided with angular depending lip surfaces along the leading edge length thereof adjacent to and disposed essentially flush with the rear bumper of the vehicle. The quarter panel spoiler plates are also provided with an angular depending lip and disposed essentially flush with the quarter panel exterior surface when in the static or undeployed position. These depending lips serve to help stabilize the undercarriage air flow when the vehicle is moving in a forward direction and assist in deploying the spoiler plates against the force of their spring connections when the vehicle undergoes spin and rearward reverse movement.

BRIEF DESCRIPTION OF THE DRAWINGS

A more complete appreciation of the invention and many of the attendant advantages thereof will be more readily apparent as the same becomes better understood in reference to the accompanying drawings wherein.

DETAILED DESCRIPTION

Figure 1:
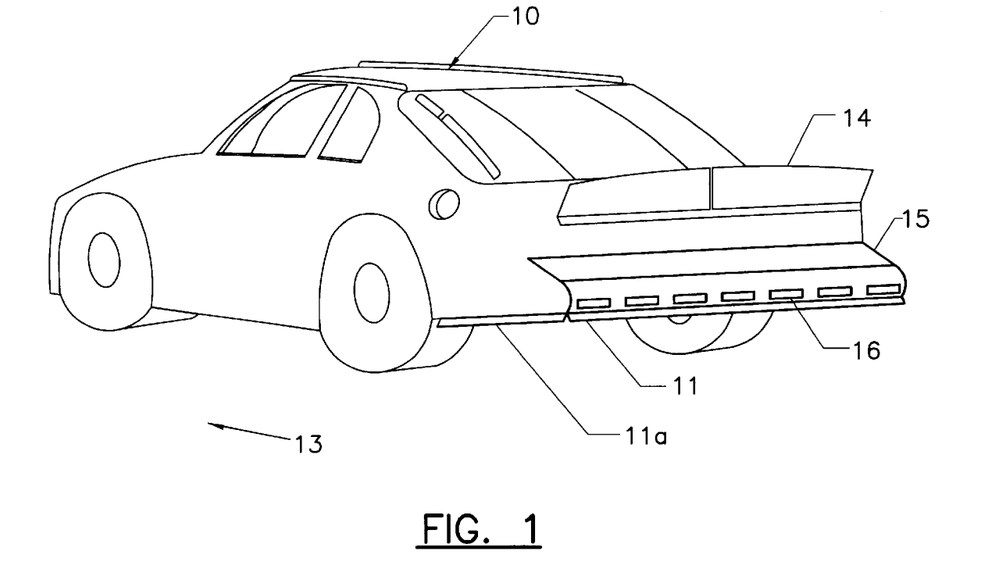
FIG. 1 is a part schematic, perspective view of a race car employing an undercarriage spoiler system according to the present invention.
Figure 1A:
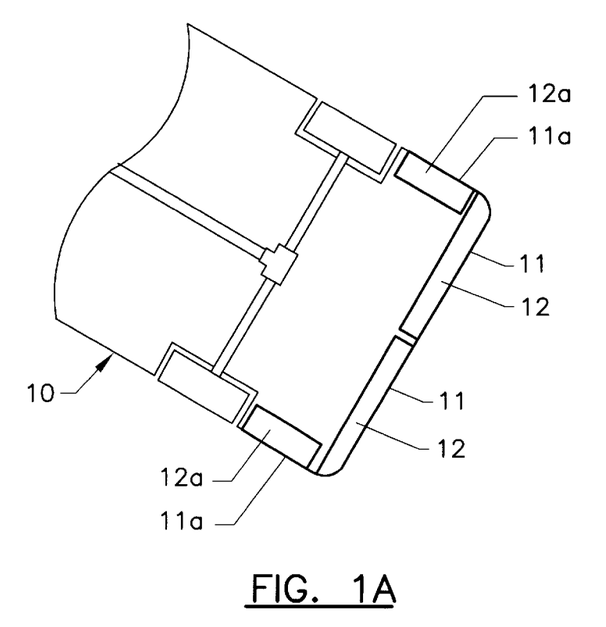
FIG. 1A is a part schematic, inverted, partial view of the race car shown in FIG. 1 and further illustrating the respective lay-out for the spoiler plates according to the present invention.

Referring now to the drawings, and more particularly to FIGS. 1 and 1A, an exemplary race car vehicle is shown and designated generally by reference numeral 10. Race vehicle 10 employs an undercarriage spoiler system 11, 11a including spoiler plates 12, 12a according to the present invention. Spoiler plates 12, 12a are shown disposed in the race position, essentially parallel with the track surface on which the race car vehicle is traveling in the forward direction, as designated by arrow 13. As illustrated, vehicle 10 is provided with a deck mounted rear spoiler 14 and a rear bumper 15.

Rear bumper 15 is provided with one or more horizontal slots along the length thereof and extending therethrough, as designated by reference numeral 16. Slots 16 serve to direct air flow onto undercarriage spoiler system 11, during vehicle spin-out and high speed rearward travel, while the air flow over the top of race car 10 is spoiled by rear deck spoiler system 14 on the rear deck of vehicle 10. Spoiler plates 12 and 12a are provided with respective, slightly down-turned, angular leading edges 17, 17a (FIG. 2) to assist in deployment thereof, as will be further explained hereinafter.

Figure 2:
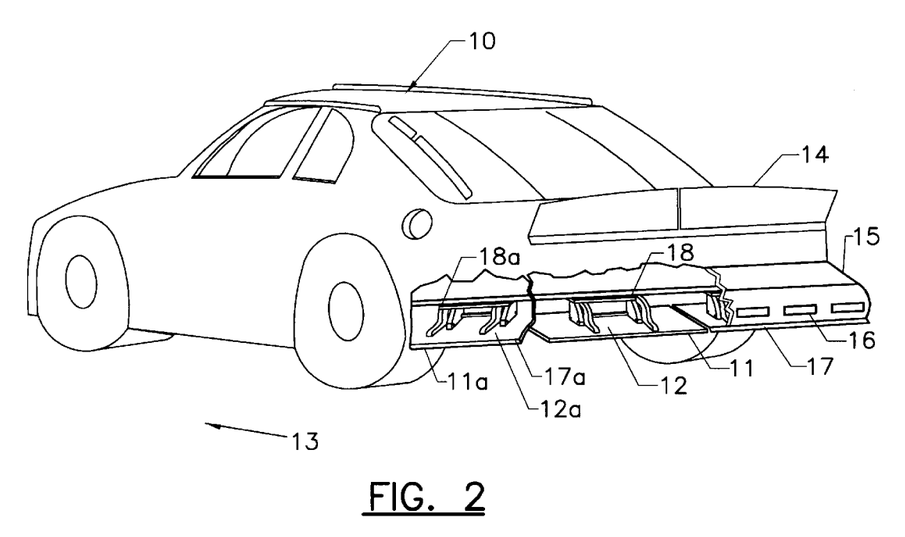
FIG. 2 is a view similar to FIG. 1, with parts cut-away, to further illustrate the undercarriage spoiler system of the present invention with the spoiler plates in the static or undeployed positions.

Referring now more particularly to FIG. 2, this cut-away view more clearly shows spoiler system 11, 11a with spoiler plates 12, 12a in the race position, as also illustrated in FIGS. 1 and 1A. As shown, horizontal attachment panels 18, 18a are secured to the vehicle frame adjacent to rear bumper 15. Since attachment panel 18 is of substantially identical construction to attachment panel 18a and, spoiler plate 12 is of substantially identical construction to spoiler plate 12a, only one set (attachment plate 18 and spoiler plate 12) will be described in detail here in the interest of brevity. In this embodiment, attachment panel 18 is provided with integral depending pivotal attachments 20, 21 and others (not shown) to pivotally support spoiler plate 12, as will be further explained hereinafter.

Figure 3:
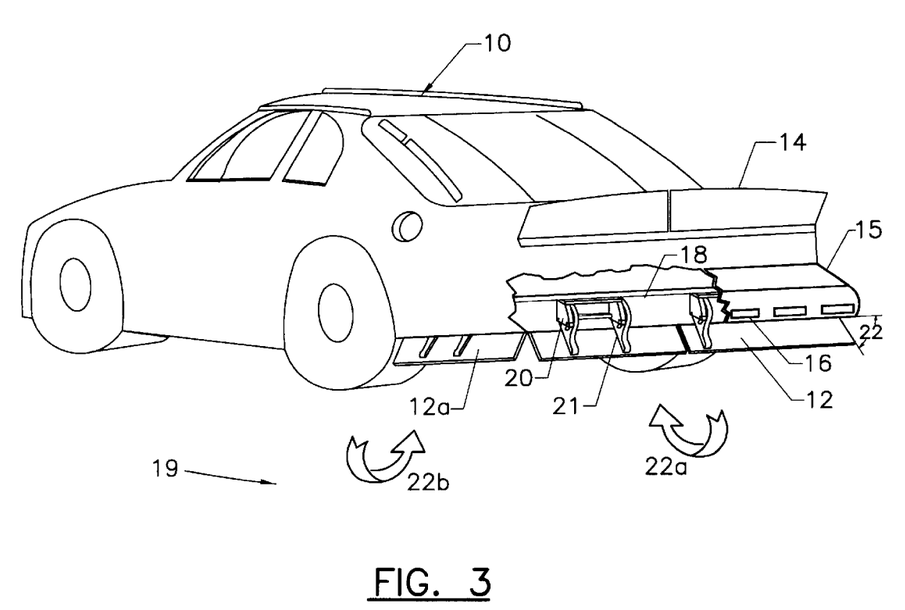
FIG. 3 is a view similar to FIG. 2 and illustrating the undercarriage spoiler system of the present invention when the vehicle is in a spin-out or high speed rearward direction mode.

Referring more particularly to FIG. 3, spoiler plate 12 is shown in the deployed position when race car 10 has undergone a spin-out and is traveling in the rearward direction, as designated by arrow 19. Pivotal attachment structure 20, 21 (and others, not designated) connect spoiler plate 12 to the horizontal attachment panel 18, as described hereinbefore and, as will be further explained hereinafter. As indicated by arrow segment 22, spoiler plate 12 is rotatable, via high pressure air flow, from a static horizontal position, parallel with the ground surface, to a deployed position 20 to 90 degrees (and preferably 50–90 degrees), relative to the horizontal position. Arrows 22a, 22b designate the direction of rotational deployment for respective spoiler plates 12 and 12a.

Figure 4A:
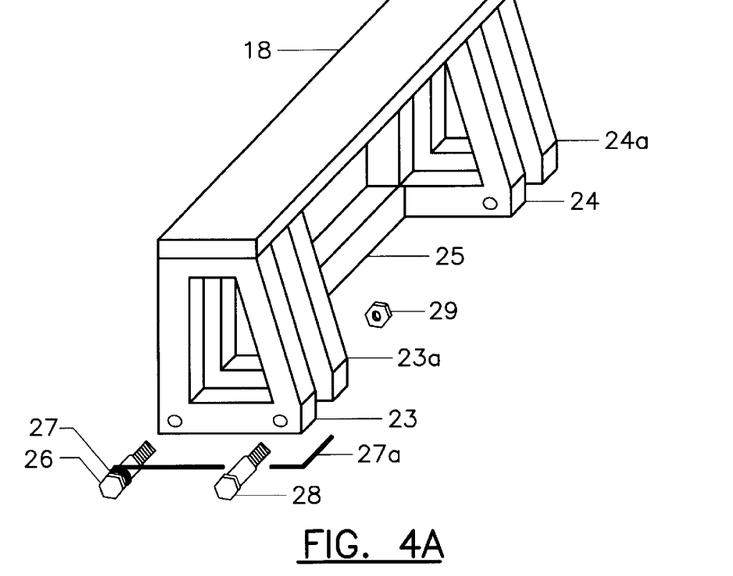
FIG. 4A is a part schematic perspective view of one horizontal mounting structure employed to attach the undercarriage spoiler of the present invention to the aft location on a race car vehicle frame.

Referring now to FIG. 4A, the details of the preferred embodiment for horizontal attachment panel 18 is shown, with parts being omitted for clarity. As shown therein, horizontal attachment panel 18 is provided with two or more depending spaced pivot mounts, as designated by reference numerals 23, 23a and 24, 24a. A horizontal stabilizer bar 25 is welded, or otherwise integrally secured, to the innermost members of adjacent depending pivot mounts 23a and 24. A shoulder bolt 26 extends through the aft base of each pivotal mount pair 23, 23a. An identical shoulder bolt, (not shown) is also provided through pivotal mounts 24, 24a. An angular stop bolt 28, provided with an attachment nut 29, extends through pivotal mounts 23, 23a. An identical stop bolt (not shown) also extends through the opposite ends of pivotal mounts 24, 24a.

Figure 4B:
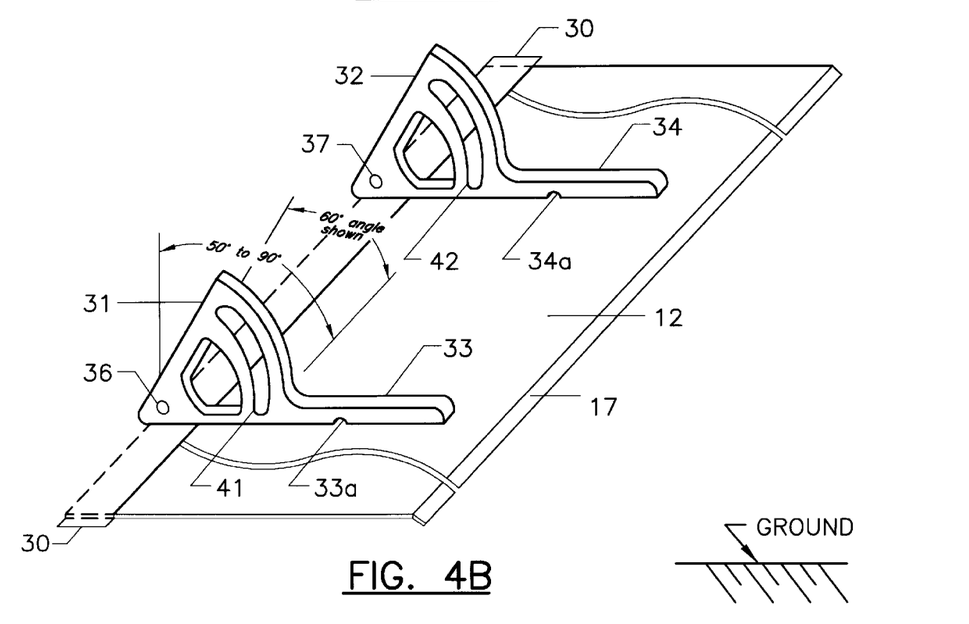
FIG. 4B is a part schematic perspective view of the spoiler plate and pivot arm assembly that is pivotally connected to the mounting structure shown in FIG. 4A according to one aspect of the present invention.

Referring now to FIG. 4B spaced pivot arms 31, 32 are welded, or otherwise fixedly attached, to spoiler plate 12 via elongated portions 33, 34. Pivot arms 31, 32 are attached to attachment panel 18 via shoulder bolt 26 (and the other shoulder bolt not shown) such that a space is provided between the trailing edge surface of spoiler plate 12 and the pivot point connection of shoulder bolts 26 (and the other, not shown). This spacing is defined by dotted lines in FIG. 4B designated by bracket 30. Spacing 30 serves as an escape duct for high pressure air flowing over spoiler plate 12. Escape duct spacing 30 has a width of 10 to 40 percent of the total width of spoiler plate 12, and will be further described hereinafter.

Elongated portions 33, 34 of pivot arms 31, 32 are provided with respective transverse slot openings 33a and 34a. Slot opening 33a serves to receive the angular portion of free end 27a of torsion spring 27 to maintain spoiler plate 12 in the static position parallel with the race surface during forward vehicle travel.

Slot opening 34a receives the angular free end of another torsion spring (not shown) on the bolt that extend through pivot mount pair 24, 24a. Pivot arm 31 is provided with a through opening 36 that serves to receive shoulder bolt 26

(FIG. 4A) therethrough to pivotally connect radial pivot arm 33 between depending pivotal mount pair 23, 23a.

Pivot arm 32 connects through a similar opening 37 and another shoulder bolt (not shown) to depending pivot mount pair 24, 24a. Pivot arm 33 is provided with an arcuate opening 41 that receives stop bolt therethrough to limit the pivotal movement of pivot arm 33 and attached spoiler plate 12. An identical stop bolt (not shown) is provided through depending mount pair 24, 24a via non-designated openings therein.

A similar arcuate opening 42 in radial pivot arm 32 also serves to limit the pivotal movement of pivot arm 32 and attached spoiler plate 12. The radial length of arcuate openings 41 and 42 determine the angular deployment movement limit for spoiler plate 12. Thus, adjustment of the angular deployment movement is obtained by selecting a pivot arm having the desired length of arcuate openings 41, 42 therein.

Figure 5A:
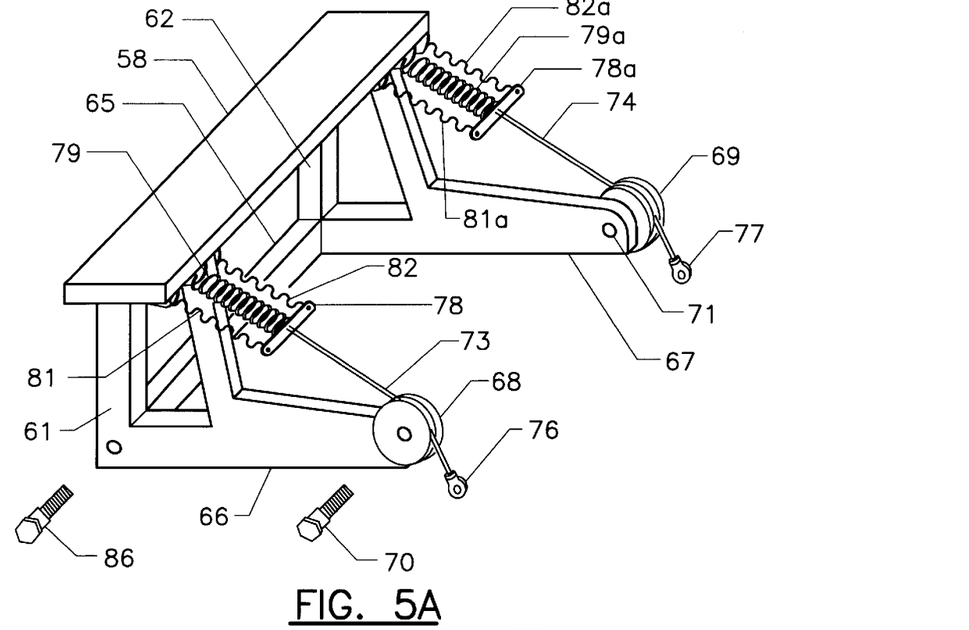
FIG. 5A is a part schematic perspective side view of another mechanism for attaching and adjusting the proper angle setting for the spoiler of the present invention.
Figure 5B:
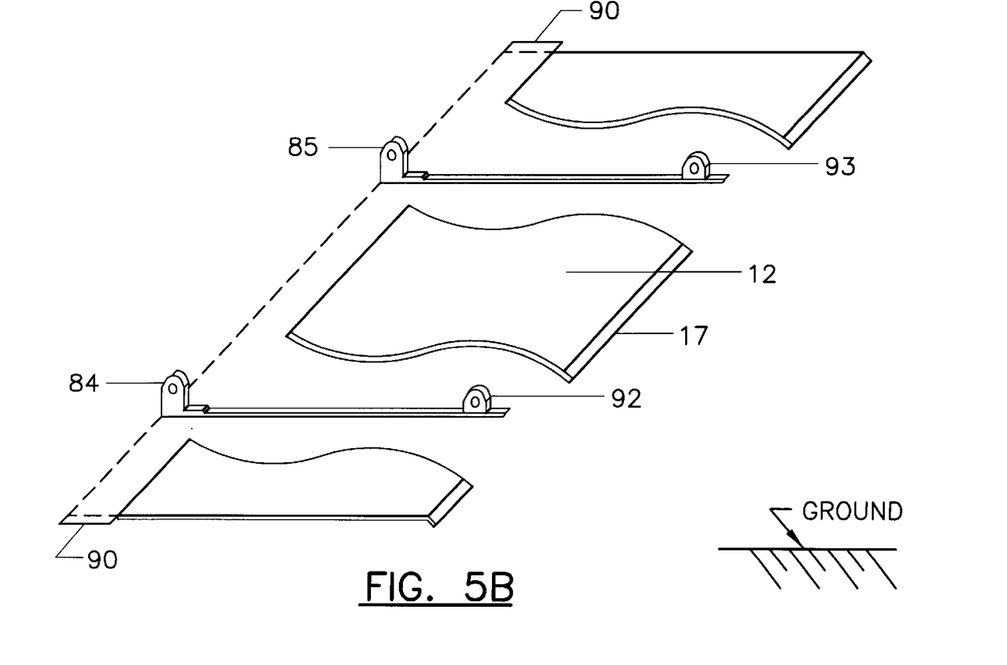
FIG. 5B is a part schematic, perspective side view of the spoiler plate structure for connection with the mechanism in FIG. 5A.

Referring now to FIGS. 5A and 5B, further details of another structure for attachment of the undercarriage spoiler of the present invention will now be described. As shown therein, a horizontal attachment panel 58 is provided with two depending spaced frames 61, 62 having a fixed stabilizer arm 65 welded, or otherwise, fixedly secured therebetween. Depending frames 61, 62 are provided with respective integral arm segments 66, 67. Arm segments of 66, 67 are provided with respective cable guide, pulley wheels 68, 69, rotatably secured thereto by shoulder bolts 70, 71. Flexible steel cables 73, 74 extend around respective pulleys 68, 59 and terminate in respective eyelet ends 76, 77. Cable 73 extends through an attachment plate 78 and is secured to one end of a tension return spring 79. Tension return spring 79 is also secured at this same end to attachment plate 78 and secured to attachment panel 58 at the other end thereof. A pair of steel adjustment limiting cables 81, 82 are disposed on each side of tension return spring 79 and also secured at one end to attachment plate 78. The other end of each limiting cable 81, 82 is secured to attachment panel 58.

Cable 74 extends through an attachment plate 78a and is secured at one end to a tension return spring 79a. Tension return spring 79a is also secured at this same end to attachment plate 78a and secured to attachment panel 58 at the other end thereof. A pair of steel adjustment cables 81a, 82a are disposed on each side of tension return spring 79a and secured at one end to attachment plate 78a. Adjustment cables 81a and 82a are each secured at one end to attachment plate 78a. The other end of each steel limiting cable 81a, 82a is secured to attachment panel 58.

Spoiler plate 12 in this embodiment is provided with a pair of spaced pivot arms 84, 85. Pivot arm 84 pivotally connects with depending frame 61 via a shoulder bolt 86 (FIG. 5A). Pivot arm 85 connects to depending frame 62 by a similar shoulder bolt, not shown. The pivot arms 84, 85 are secured to plate 12 such that a space or escape duct is provided between the trailing edge surface of spoiler plate 12 and the pivot point connection of the shoulder bolt 86 (and the other not shown). This spacing is illustrated by dotted lines in FIG. 5B and designated by bracket 90. As in the embodiment of FIGS. 4A and 4B, spacing 90 serves as an escape duct for high pressure air flowing over spoiler plate 12 and is of similar dimensions as spacing 30 (FIG. 4B), as described hereinbefore. A pair of bosses 92, 93 having openings therein are welded or otherwise rigidly attached to the surface of spoiler plate 12 to permit attachment of flexible steel cables 73, 74 via suitable bolts 94, 95 (FIG. 5C).

Figure 5C:
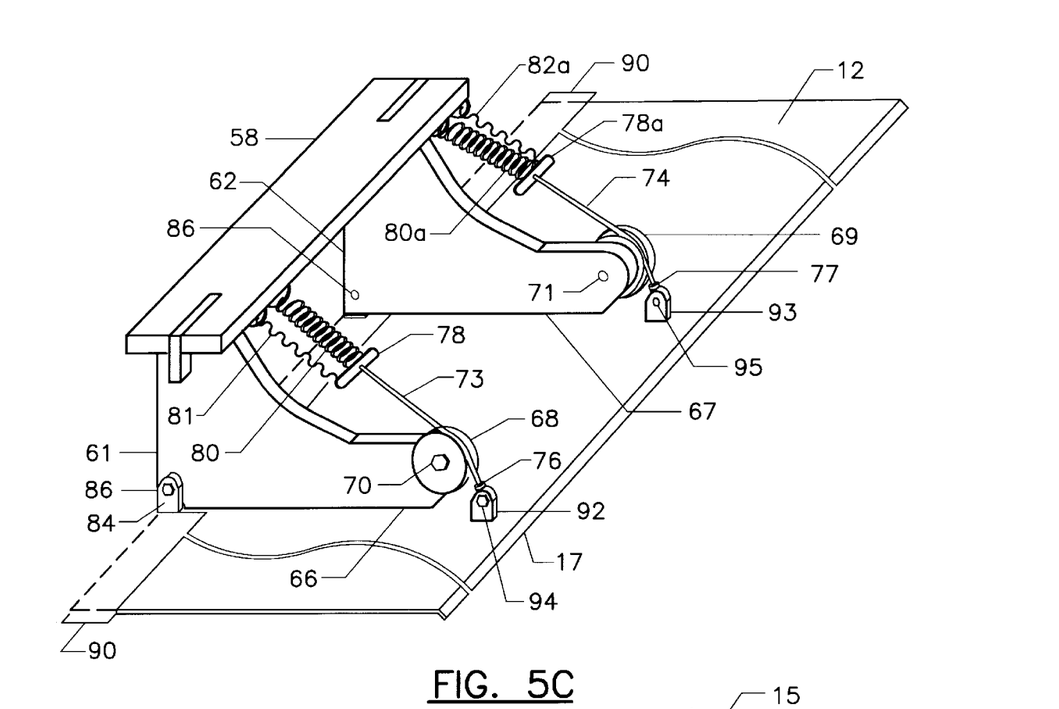
FIG. 5C is a part schematic, perspective view of another mechanism for attaching and selecting the desired angle setting for the spoiler system of the present invention; and, FIG. 6 is an enlarged, part schematic, perspective view of a portion of the vehicle rear bumper illustrating the horizontal air slots therethrough and the spoiler air deflector lip position in relation to the bumper.

Referring further to FIG. 5C, another embodiment of the spoiler plate assembly is shown. The components of this embodiment are substantially identical to that of FIGS. 4A, 4B except that single limiting cables 81, 82a are employed to replace duplicate limiting cables 81, 82 and 81a, 82a. Single limiting cables 81, 82a are linearly adjacent to respective tension return springs 80, 80a, which are of the same construction and function as in FIGS. 5A, 5B. Further description of these common components of FIG. 5C is believed unnecessary and is omitted in the interest of brevity.

Figure 6:
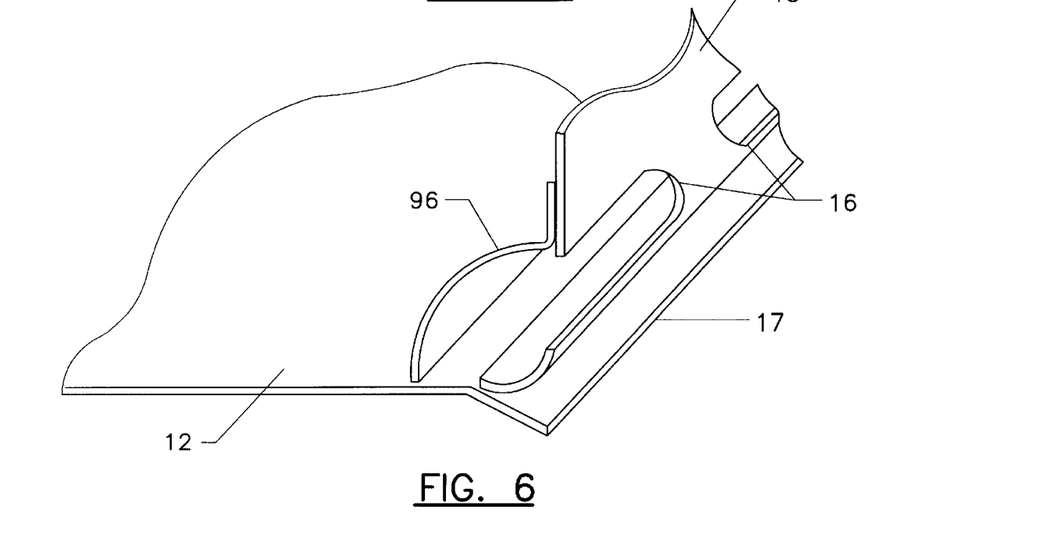

Referring now to FIG. 6, this enlarged segment more clearly illustrates the rear bumper interaction with the undercarriage spoiler system of the present invention. As shown therein, bumper 15 is provided with an air baffle 96 secured to the interior surface and along the entire length thereof. During a spin-out, baffle 96 serves to immediately direct high speed air flow received through bumper slots 16 during rearward vehicle movement directly onto the upper surface of spoiler plate 12.

The operation of the present invention is believed apparent from the above description. During normal race conditions and vehicle 10 is traveling in a forward direction, as indicated by arrow 13 (FIGS. 1 and 2), the undercarriage spoiler plates 12, 12a are disposed in a static or un-deployed position. This static position is essentially parallel with the race track surface and spoiler plates 12 and 12a help maintain a stabilizing air flow over the undercarriage of the vehicle 10. Once a spin-out is initiated, the undercarriage rear quarter panel spoiler plate 12a on the vehicle side in the direction of the spin is immediately affected by the airflow on the depending lip surface 17a thereof. This directional change in the high speed air flow causes spoiler plate 12a to overcome the spring retention force thereon and move toward the position illustrated in FIG. 3. The side air pressure maintains spoiler plate 12a in this position to spoil the undercarriage air flow and stabilize vehicle 10. As the vehicle spin approaches the 140 to 180 degree angle, the vehicle goes into an angular rearward direction position and spoiler plate(s) 12 are deployed by the airflow initially striking depending lip(s) 17 with further deployment, by the air flow through the slotted bumper thereon, to the maximum angle selected for the spoiler action. As described, hereinbefore, the air flow through bumper slots 16 impinges directly onto air baffle 96 where it is diverted against spoiler plate 12. The maximum angle deflection or deployment of spoiler plate(s) 12 and 12a is determined by the construction of radial pivot arms 31, 32 (FIGS. 4A, 4B) or by the selected length of the steel adjustment limiting cables 81, 82 (FIGS. 5A, 5C).

The spoiler plate segments would normally be in the range of six to ten inches in width but could be less or more depending upon the application thereof. No particularly materials have been described for constructing the various components of the present invention, it being understood that it is desirable to keep the weight thereof at a minimum and any suitable length, width, thin, and light weight material such as structural composites, metals such as sheet steel, aluminum and aluminum alloys, titanium and titanium alloys, and the like, may be employed to construct the components parts described herein. Thus, any materials having the necessary strength and durability for the purposes intended are considered within the scope of the present invention.

There are obviously numerous variations and modifications of the specific embodiments described herein that will be readily apparent to those skilled in the art in light of the above teachings.

It is therefore to be understood that, within the scope of the appended claims, the invention may be practiced other than as specifically described herein.

What is claimed as new and desired to be secured by Letters Patent of the United States is:

1. An undercarriage spoiler system for a motor vehicle, comprising:

said motor vehicle being capable of traveling at high speeds on a race surface and having aerodynamic surfaces, and including a rear bumper and a vehicle frame, said undercarriage air spoiler system for said motor vehicle secured to said vehicular frame, said undercarriage air spoiler system including at least one spoiler plate for said motor vehicle, means for pivotally connecting said at least one spoiler plate to said vehicle in a position to spoil the air flow over the vehicle undercarriage during high speed vehicle spin-out and rearward movement; and stop means for limiting the pivotal movement of said spoiler plate relative to the undercarriage surfaces of said motor vehicle.

2. The undercarriage spoiler system of claim 1 wherein said at least one spoiler plate for said vehicle is attached to said vehicular frame and disposed parallel with and adjacent said vehicle rear bumper.

3. The undercarriage spoiler system of claim 2 wherein said at least one spoiler plate is a unitary structure and extends substantially the entire length of said vehicle rear bumper.

4. The undercarriage spoiler system of claim 3 wherein said at least one spoiler plate comprises a pair of spoiler plates having a combined length substantially equal to the entire length of said vehicle rear bumper.

5. The undercarriage spoiler system of claim 2 wherein said at least one spoiler plate includes a leading edge and a trailing edge and wherein said leading edge is disposed adjacent said vehicle rear bumper when said vehicle is traveling at high speed in a forward direction and said trailing edge is adjacent said means for pivotally attaching said at least one spoiler plate to said vehicular frame.

6. The undercarriage spoiler system of claim 5 wherein said leading edge for said at least one spoiler plate includes an angular depending lip surface extending below said rear bumper and in position to be influenced by air flow on said vehicle rear bumper during high speed vehicle spin-out.

7. The undercarriage spoiler system of claim 5 wherein said trailing edge of said at least one spoiler plate is disposed spaced from the pivot point connection of said at least one spoiler plate to said vehicle frame.

8. The undercarriage spoiler system of claim 1 wherein said at least one spoiler plate is attached to said vehicle frame in perpendicular spaced relationship with said vehicle rear bumper.

9. The undercarriage spoiler system of claim 8 wherein said at least one spoiler plate includes a spoiler plate disposed in the rear quarter panel area on each side of said vehicle.

10. The undercarriage spoiler system of claim 1 wherein said at least one spoiler plate includes a first spoiler plate attached to said vehicle frame disposed parallel with and adjacent said vehicle rear bumper and an additional spoiler plate disposed in each rear quarter panel of said vehicle perpendicular to said first spoiler plate.

11. The undercarriage spoiler system of claim 1 wherein said means for pivotally connecting said at least one spoiler plate to said vehicle includes at least one spring extending a spring force for maintaining said at least one spoiler plate in parallel relationship with the vehicle undercarriage and the travel surface for said vehicle during high speed forward travel of said vehicle, and said at least one spoiler plate being responsive to high speed air flow thereagainst during vehicle spin-out and rearward direction to overcome said spring force and permit pivotal movement of said at least one spoiler plate from being in parallel relationship with the vehicle undercarriage and the travel surface to a controlled angular relationship with the vehicle undercarriage to thereby spoil the air flow over the vehicle undercarriage.

12. The undercarriage spoiler system of claim 11 wherein said means for pivotal connection of said at least one spoiler plate to said vehicle further includes a horizontal attachment plate rigidly secured to said vehicle frame, at least one depending pivot mount integral with said horizontal attachment plate, at least one pivot arm being pivotally connected to said at least one depending pivot mount and rigidly attached to said at least one spoiler plate.

13. The undercarriage spoiler system of claim 12 wherein said at least one spoiler plate is provided with a leading edge and a trailing edge and wherein said trailing edge is spaced a distance from the pivot point connection of said pivot arm and said pivot mount to provide an escape slot for high pressure air flowing against said at least one spoiler plate when said at least one spoiler plate is in an angular relationship with the vehicle undercarriage and travel surface.

14. The undercarriage spoiler system of claim 11 wherein said at least one spring exerting force on said at least one spoiler plate is a spring selected from the group of springs consisting of torsion springs and tension springs.

15. The undercarriage spoiler system of claim 11 including means for limiting the angular movement of said at least one spoiler plate.

16. The undercarriage spoiler system of claim 15 wherein the means for limiting the angular movement of said at least one spoiler plate includes a steel cable connecting said horizontal attachment panel to said at least one spoiler plate, said steel cable being adjustable in length to adjust the angular movement of said at least one spoiler plate between 20 and 90 degrees, and preferably between 50 and 90 degrees, relative to the vehicle undercarriage.

17. The undercarriage spoiler system of claim 15 wherein the means for limiting the angular movement of said at least one spoiler plate includes an arcuate opening provided through said at least one pivot arm, a stop bolt extending transversely through said at least one depending pivot mount and through said arcuate opening in said at least one pivot arm, said stop bolt adapted to engage and end of said arcuate opening in said at least one pivot arm and restrict further movement of said at least one pivot arm, said arcuate opening being dimensioned to limit pivot of said spoiler plate to the range of 50 to 90 degrees relative to said vehicle undercarriage.

18. An undercarriage spoiler system for a motor vehicle, comprising:

said motor vehicle having aerodynamic surfaces and capable of traveling at high speeds on a race surface, said motor vehicle further including a rear bumper and a vehicle frame, said undercarriage air spoiler system for said motor vehicle secured to said vehicular frame, said undercarriage air spoiler system including at least one spoiler plate for said motor vehicle, means for pivotally connecting said at least one spoiler plate to said vehicle in a position to spoil air flow over the vehicle undercarriage during high speed vehicle spin-out and rearward movement; and horizontal slot means provided through and along the length of said rear bumper to channel high speed air flow therethrough over the vehicle undercarriage during vehicle spin-out and rearward vehicle movement.

19. The undercarriage spoiler system of claim 18 wherein said at least one spoiler plate is attached to said vehicular frame and disposed parallel with and adjacent to said vehicle rear bumper.

20. The undercarriage spoiler system of claim 19 including an air baffle disposed along the interior length of said rear bumper and serving to divert air flow passing through said horizontal slot means onto said at least one spoiler plate.

* * * * *

UNITED STATES PATENT AND TRADEMARK OFFICE
CERTIFICATE OF CORRECTION

PATENT NO.     : 6,196,620 B1
DATED          : February 20, 2001
INVENTOR(S)    : William M. Haraway, Jr.

It is certified that error appears in the above-identified patent and that said Letters Patent is hereby corrected as shown below:

<u>Title page,</u>
Item [76] should read -- William M. Haraway, Jr.

Signed and Sealed this

Thirtieth Day of October, 2001

Attest:

*Attesting Officer*

NICHOLAS P. GODICI
*Acting Director of the United States Patent and Trademark Office*